(12) United States Patent
Chiang

(10) Patent No.: US 7,304,811 B2
(45) Date of Patent: Dec. 4, 2007

(54) OPTICAL MODULE

(75) Inventor: Tsung-Wei Chiang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/437,196

(22) Filed: May 18, 2006

(65) Prior Publication Data

US 2007/0030579 A1 Feb. 8, 2007

(30) Foreign Application Priority Data

Aug. 5, 2005 (CN) .................. 2005 1 0036407

(51) Int. Cl.
G02B 7/02 (2006.01)
G02B 7/02 (2006.01)

(52) U.S. Cl. ...................... 359/808; 359/811

(58) Field of Classification Search ............. 359/808, 359/811, 818, 827, 529, 826
See application file for complete search history.

(56) References Cited

U.S. PATENT DOCUMENTS

| 2,496,584 | A | * | 2/1950 | Geiger et al. | ............... 368/294 |
|---|---|---|---|---|---|
| 3,904,276 | A | * | 9/1975 | Whitaker et al. | ........... 359/819 |
| 4,302,076 | A | * | 11/1981 | Hashimoto | .................. 359/830 |
| 6,898,030 | B1 | * | 5/2005 | Lin et al. | ..................... 359/819 |
| 2002/0005997 | A1 | * | 1/2002 | Oba | ............................ 359/819 |
| 2002/0141079 | A1 | * | 10/2002 | Onda | .......................... 359/819 |
| 2004/0109240 | A1 | * | 6/2004 | Sato et al. | ................... 359/704 |
| 2004/0227845 | A1 | * | 11/2004 | Kawai | ......................... 348/360 |
| 2005/0141106 | A1 | * | 6/2005 | Lee et al. | .................... 359/808 |
| 2006/0028573 | A1 | * | 2/2006 | Seo et al. | .................... 348/340 |
| 2006/0171046 | A1 | * | 8/2006 | Recco et al. | ................. 359/811 |
| 2006/0204243 | A1 | * | 9/2006 | Tsai | ............................ 396/529 |

* cited by examiner

Primary Examiner—Jordan Schwartz
Assistant Examiner—James C Jones
(74) Attorney, Agent, or Firm—Jeffrey T. Knapp

(57) ABSTRACT

An optical module (100) includes a lens barrel (10), a lens (201), and a clip (50). The lens barrel has a groove (104) defined in an inner periphery thereof. The lens is engagingly received in the lens barrel. The clip is received in the groove of lens barrel to fix the lens in the lens barrel.

14 Claims, 4 Drawing Sheets

//  OPTICAL MODULE

TECHNICAL FIELD

The present invention generally relates to optical modules used in photography and imaging equipment and, more particularly, to an optical module for a digital camera.

BACKGROUND

Currently, digital camera modules are included as a feature in a wide variety of portable electronic devices and, of course, in stand-alone digital camera units. Most portable electronic devices are becoming progressively more miniaturized over time, and digital camera modules are correspondingly becoming smaller and smaller. Nevertheless, in spite of the small size of a contemporary digital camera module, consumers still demand excellent imaging.

Optical modules used for digital camera modules typically include a barrel, a lens module, a spacer, and a filter. The lens module and the spacer are received in the barrel. The filter is fixedly mounted in the barrel by using, for example, a glue/adhesive, thereby preventing the lens module and the filter from falling out of the barrel. When the glue/adhesive used to adhere the filter to the barrel is dilute, it can seep into the lens module via capillary action, thus impairing imaging quality of the optical module.

Therefore, a new optical module is desired in order to overcome the above-described shortcomings.

SUMMARY

In one embodiment thereof, an optical module includes a lens barrel, a lens, and a clip. The lens barrel has a groove defined in an inner periphery thereof. The lens is engagingly received in the lens barrel. The clip is received in the groove of lens barrel to fix the lens in the lens barrel.

Other novel features will become more apparent from the following detailed description when taken in conjunction with the accompanying drawings.

BRIEF DESCRIPTION OF THE DRAWINGS

Many aspects of the optical module can be better understood with reference to the following drawings. The components in the drawings are not necessarily drawn to scale, the emphasis instead being placed upon clearly illustrating the principles of the present optical module. Moreover, in the drawings, like reference numerals designate corresponding parts throughout the several views.

DETAILED DESCRIPTION OF THE EMBODIMENTS

Figure 1:
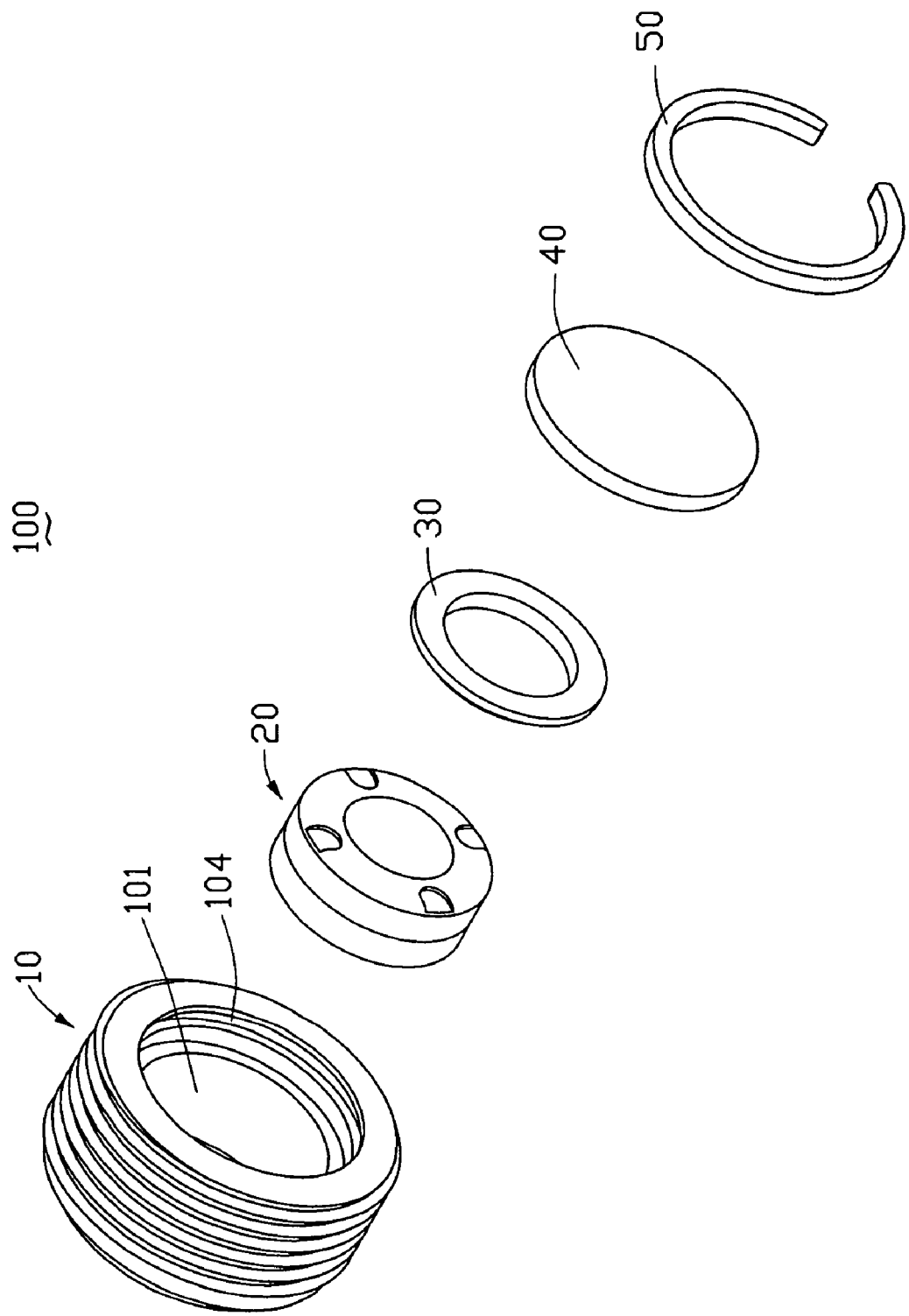
FIG. 1 is an exploded, isometric view of an optical module in accordance with a first embodiment.
Figure 2:
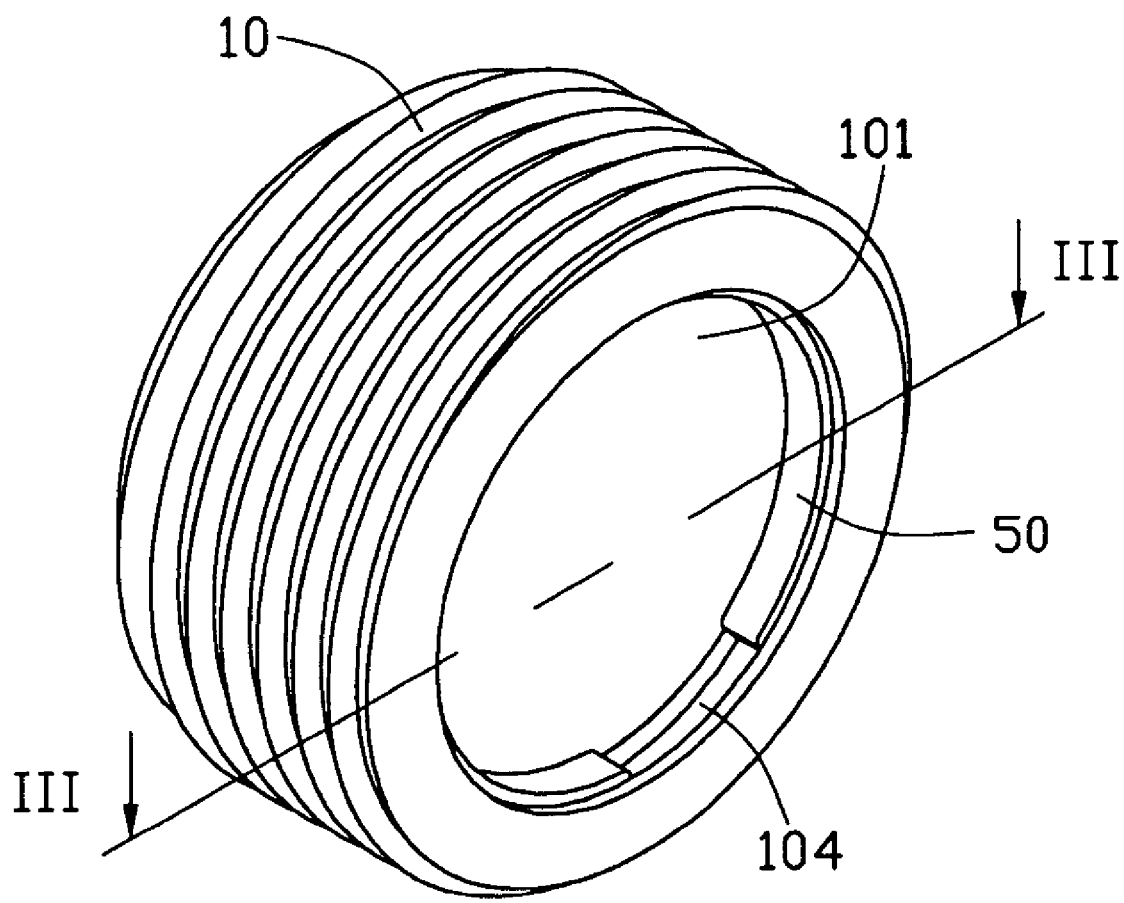
FIG. 2 is an enlarged, assembled, isometric view of the optical module shown in FIG. 1.

Referring to FIG. 1, an optical module 100 according to a first embodiment of the present invention includes a lens barrel 10, a lens module 20, a spacer 30, a filter 40, and a clip 50. Referring also to FIG. 2, the lens module 20, the spacer 30, the filter 40, and the clip 50 are engagingly received in the lens barrel 10 one on top of the other in that order.

Figure 3:
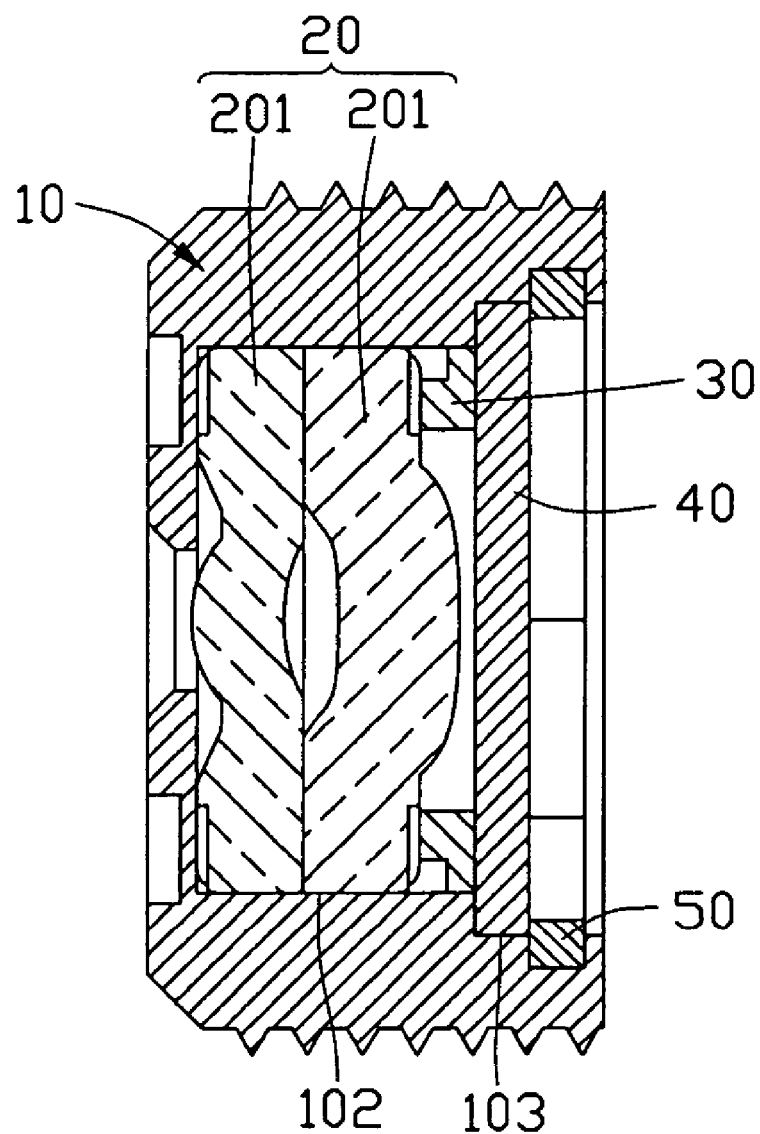
FIG. 3 is an enlarged, cross-sectional view taken along line III-III of FIG. 2.

Referring also to FIG. 3, the lens barrel 10 is substantially a hollow cylinder, having a partially-closed end and an open end on the opposite end to the partially-closed end. The lens barrel 10 includes a columned ladderlike cavity 101 therein. The cavity 101 has a small diameter cavity 102 adjacent to the partially-closed end, and a large diameter cavity 103 adjacent to the open end. The small diameter cavity 102 is configured for receiving the lens module 20 and the spacer 30. The large diameter cavity 103 is configured for receiving the filter 40. An annular groove 104 is defined in a surface of the large diameter cavity 103, and is configured for receiving the clip 50.

The lens module 20 includes at least one lens. In the illustrated embodiment, the lens module 20 includes two lenses 201. It is to be understood that lenses of any number and type could be used in the lens module 20.

The spacer 30 is substantially ring-shaped. The spacer 30 is engagingly received in the small diameter cavity 102 of the lens barrel 10. The spacer 30 is configured for adjusting a distance between the lens module 20 and other optical elements (for example the filter 40) of the optical module 100.

The filter 40 is substantially disk-shaped. The filter 40 is engagingly received in the large diameter cavity 103 of the lens barrel 10. The filter 40 is used to selectively transmit light having certain properties, while blocking the remainder. The filter 40 can be selected, for example, from a group consisting of infrared-cut filters and low pass filters.

The clip 50 is substantially a C-shaped ring, and made of elastic material. The clip 50 has an outer diameter slightly greater than a diameter of the groove 104 of the lens barrel 10, so that the clip 50 will be in a compressed state when the clip 50 is located in the groove 104 of the lens barrel 10, and will fix the lens module 20, the spacer 30, and the filter 40 in the lens barrel 10. In alternative embodiments, the clip 50 can be replaced by another fixation element which can fix the lens module 20, the spacer 30, and the filter 40 in the lens barrel 10.

In assembly of the optical module 100, the lens module 20, the spacer 30, and the filter 40 are received in the cavity 101 of the lens barrel 10 in that order, and the lens module 20 is adjacent to the partially-closed end of the lens barrel 10. Then, the clip 50 aligns with the open end of the lens barrel 10, and an operator exerts a force on the clip 50, such that the clip 50 is deformed and located in the groove 104. At this time, the lens module 20, the spacer 30, the filter 40, and the clip 50 are all received in the cavity 101 of the lens barrel 10. The spacer 30 is located between the lens module 20 and the filter 40, with the spacer 30 abutting the lens module 20 and the filter 40. The filter 40 is located between the spacer 30 and the clip 50, with the filter 40 abutting the spacer 30 and the clip 50. The clip 50 is in a compressed state, thereby preventing the lens module 20, the spacer 30, and the filter 40 from falling out of the lens barrel 10, and fixing the lens module 20, the spacer 30, and the filter 40 in the lens barrel 10. The optical module 100 is thus completely assembled.

In the above-described assembly processes, the clip 50 can fix the lens module 20, the spacer 30, and the filter 40 in the lens barrel 10. Therefore there is no need to use a glue/adhesive, so the lens module 20 will not be polluted by the glue/adhesive. Imaging quality of the optical module 100 can thus be improved.

Figure 4:
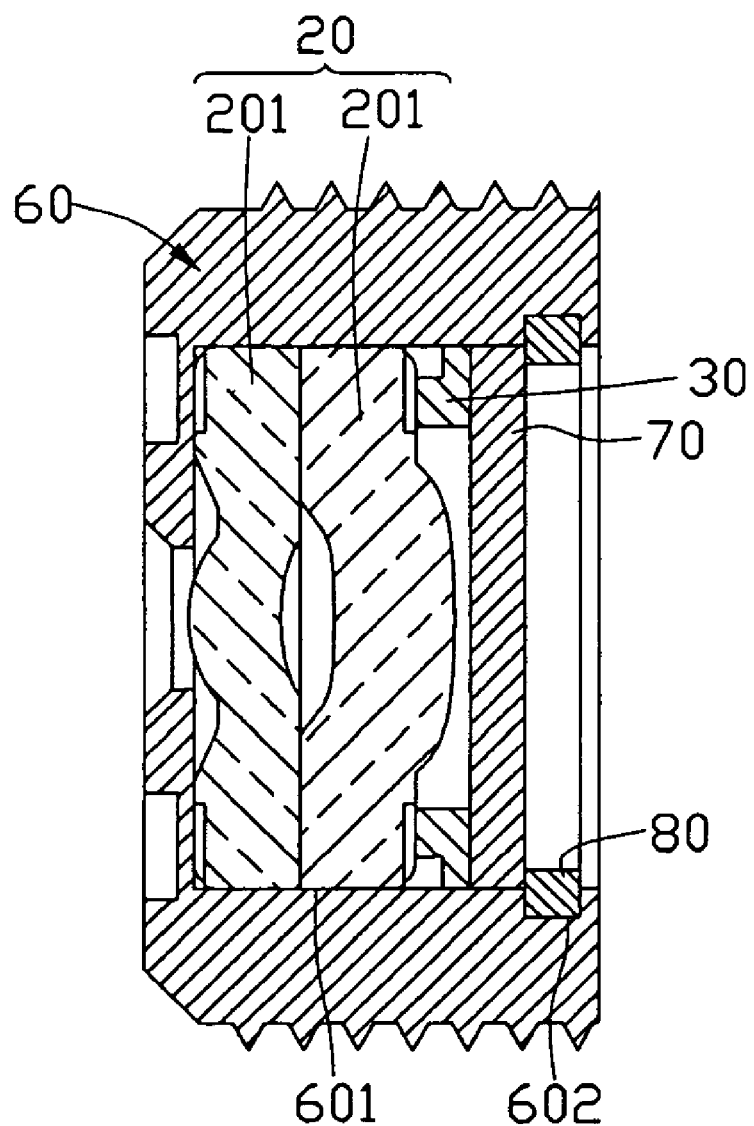
FIG. 4 is a schematic, cross-sectional view of an optical module in accordance with a second embodiment.

Referring to FIG. 4, an optical module 200 according to a second embodiment of the present invention is shown.

Most of the structure of the optical module 200 of the second embodiment is similar to that of the optical module 100 of the first embodiment, except that a cavity 601 of a lens barrel 60 has a diameter cavity (not labeled). A groove 602 is defined in a surface of the cavity 601 adjacent to an open end of the lens barrel 60. A diameter of a clip 80 is slightly greater than a diameter of the groove 602. The clip 80 is in a compressed state when the clip 80 is located in the groove 602 of the lens barrel 60, thereby preventing a lens module 20, a spacer 30, and a filter 70 from falling out of the lens barrel 60, and fixing the lens module 20, the spacer 30, and the filter 70 in the lens barrel 60.

In the above-described embodiments, the lens barrels 10, 60, the cavities 101,601, the spacer 30, the filters 40, 70 are all round-shaped. In alternative embodiments, the lens barrels 10, 60, the cavities 101,601, the spacer 30, the filters 40, 70 could be of another suitable shape, for example, arc-shaped.

In alternative embodiments, the spacer 30 could be omitted. Also, the filters 40, 70 could be omitted.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An optical module, comprising:
    a lens barrel having a partially-closed end and an open end, the open end being at an end of the lens barrel opposite to the partially-closed end, the lens barrel defining a groove in an inner periphery adjacent to the open end, the lens barrel defining a hollow cylinder with a cavity therein, the cavity defining a small diameter cavity adjacent to the partially-closed end and a large diameter cavity adjacent to the open end;
    a lens module engagingly received in the lens barrel, the lens module including a plurality of lenses;
    a spacer engagingly received in the small diameter cavity of the lens barrel, with the spacer abutting the lens module; and
    a clip received in the groove of the lens barrel in a manner so as to prevent the lenses of the lens module from falling out of the lens barrel.

2. The optical module as claimed in claim 1, wherein lens barrel is a hollow cylinder having a partially-closed end and an open end at the opposite end of the lens barrel to the partially-closed end.

3. The optical module as claimed in claim 1, further comprising a filter, wherein the filter is engagingly received in the lens barrel, with the filter abutting the spacer and the clip.

4. The optical module as claimed in claim 3, wherein the filter is one of infrared-cut filter and low pass filter.

5. The optical module as claimed in claim 1, further comprising a filter, wherein the filter is engagingly received in the large diameter cavity of the lens barrel, with the filter abutting the spacer and the clip.

6. The optical module as claimed in claim 1, wherein the clip is a C-shaped ring, and is made of elastic material.

7. The optical module as claimed in claim 6, wherein an outer diameter of the clip is greater than a diameter of the groove of the lens barrel.

8. An optical module, comprising:
    a lens barrel having a front end and defining a groove adjacent to the front end;
    a lens module located in the lens barrel;
    a spacer located in the lens barrel, with the spacer abutting the lens module; and
    an elastic fixation element engaged in the groove of the lens barrel in a manner so as to prevent the lenses of the lens module from falling out of the lens barrel.

9. The optical module as claimed in claim 8, wherein the fixation element is a clip.

10. The optical module as claimed in claim 1, further comprising a filter, wherein the filter is located in the lens barrel, with the filter abutting the spacer and the fixation element.

11. The optical module as claimed in claim 10, wherein the lens barrel is a hollow cylinder having a partially-closed end and an open end at the opposite end of the lens barrel to the partially-closed end.

12. The optical module as claimed in claim 11, wherein the cavity defines a small diameter cavity adjacent to the partially-closed end and a large diameter cavity adjacent to the open end, the spacer is engagingly received in the small diameter cavity of the lens barrel.

13. The optical module as claimed in claim 12, wherein the filter is engagingly received in the large diameter cavity of the lens barrel.

14. The optical module as claimed in claim 10, wherein the filter is one of an infrared-cut filter and a low pass filter.

* * * * *